Nov. 1, 1966    A. R. PANGBORN    3,282,369
SECURITY HOOD LATCHING DEVICE FOR MOTOR VEHICLES
Filed July 15, 1964
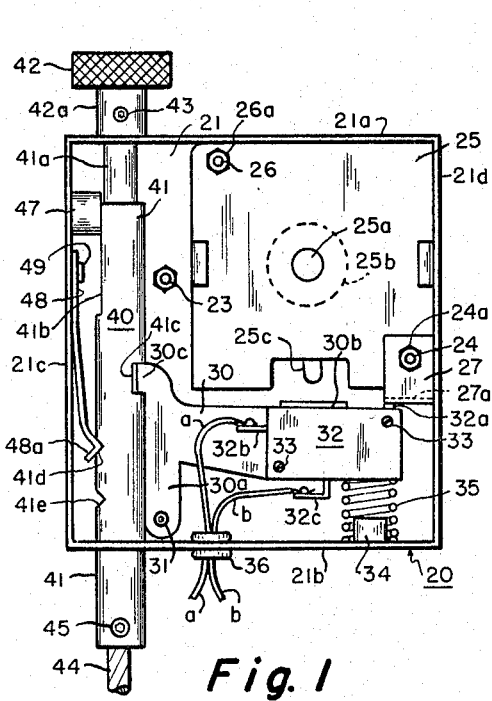
Fig. 1
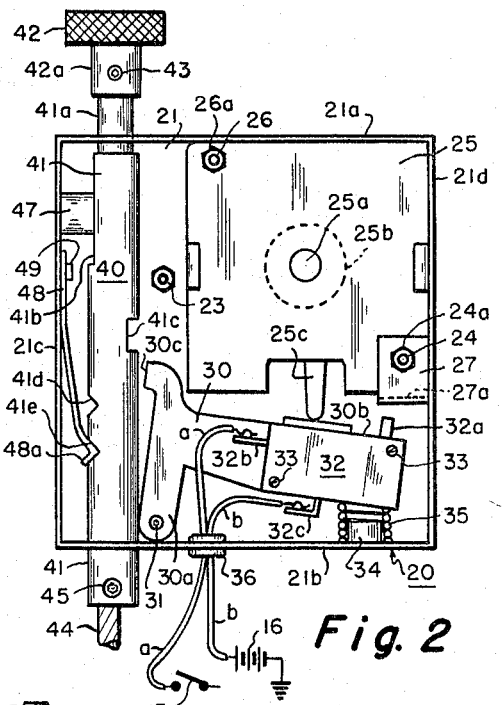
Fig. 2
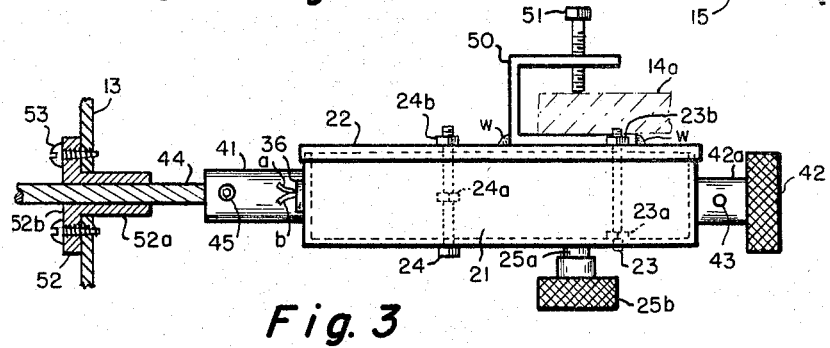
Fig. 3
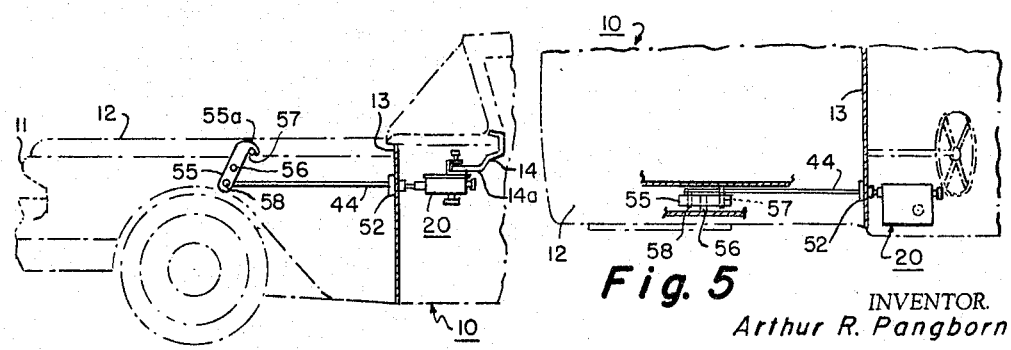
Fig. 4
Fig. 5
INVENTOR.
Arthur R. Pangborn
BY Green, McCallister & Miller
HIS ATTORNEYS

United States Patent Office 3,282,369
Patented Nov. 1, 1966

3,282,369
SECURITY HOOD LATCHING DEVICE FOR
MOTOR VEHICLES
Arthur R. Pangborn, 317 Greenlee Road, Pittsburgh, Pa.
Filed July 15, 1964, Ser. No. 382,895
14 Claims. (Cl. 180—82)

This invention relates to a theft-preventing device for a motor vehicle, such as an ordinary automobile and particularly, to a device which controls the latching and unlatching of a compartment of a motor vehicle so that unauthorized access cannot be obtained thereto. A phase of the invention relates to a device which may be further employed to maintain the electrical or ignition system of the vehicle disconnected when the compartment is latched. Another phase of the invention relates to a device which may be employed in place of or to supplement the conventional ignition switch of the motor vehicle and whose operation may be readily controlled by the owner.

One of the problems of theft protection for a motor vehicle is that a skillful thief can readily employ a so-called "jumper" to energize the electrical or ignition system, when the ignition switch is still open, without the insertion of a proper key for unlocking it. The device of my present invention deals with a solution to this problem, in that it provides means for locking or latching a compartment of a vehicle, such as of the hinged hood of the motor compartment, in such a manner that it is impossible to open the compartment or gain entrance to the engine compartment to employ a "jumper" without the proper unlocking of a lock associated with the device. In addition, I have provided supplemental means which is operated to simultaneously open and close the ignition circuit or source of energizing electric current to the motor of the vehicle in accordance with whether the hood is latched or unlatched. It is contemplated that the latching means of the device will be independent of a conventional latching means for the compartment or the hood of the vehicle, so that the hood may be maintained in a closed position during its normal operation, after the device has been operated to unlatch the security latching means of my construction.

It has thus been an object of my invention to solve the problem of automobile or vehicular theft from the standpoint of the thief's gaining entrance to a normally closed compartment of the automobile, such as the motor compartment.

Another object of my invention has been to develop a device or operating system which may be readily controlled by the authorized user of the vehicle, which will not only confuse a thief but will make it impossible for the thief to readily operate the vehicle;

Another object of my invention has been to provide a security device which will take the place of or supplement the usual ignition switch to maintain the ignition circuit open when it is desired to maintain the vehicle in a locked condition.

A further object of my invention has been to devise a device utilizing a combination lock in a simplified manner for simultaneously latch-engaging and maintaining a compartment or hinged hood of the engine compartment closed and for maintaining the electrical or ignition circuit or system of the vehicle open irrespective of whether the ignition switch is open or closed.

A still further object of my invention has been to provide a security device which may be made operative or inoperative at the owner's option, so that the vehicle may be utilized in the conventional manner as by the parking attendants of a parking lot.

These and other objects of my invention will appear to those skilled in the art from the illustrated embodiment thereof and the appended claims.

In the illustrated embodiment of my invention, FIGURE 1 of the drawings is a front view in elevation of a device of my invention with a closure or cover plate of its housing removed; this view shows the device in its plunger latched and switch opening position;

FIGURE 2 is a view on the scale of and similar to FIGURE 1 but showing the device in its plunger unlatching and switch closing position;

FIGURE 3 is a longitudinal end view of the device of FIGURES 1 and 2 with its cover plate in position and on the scale of such figures; this view, like FIGURE 1, shows the device in its plunger latched position;

FIGURE 4 is a fragmental, reduced, somewhat diagrammatic side view in elevation showing a utilization of the device of FIGURES 1 to 3, inclusive, with a typical motor vehicle. This view illustrates a mounted operating position of the device as used with an operating shaft and a pivoted latch for the hood;

FIGURE 5 is a sectional plan view on the scale of FIGURE 4 showing the device in the mounted position of FIGURE 4; it will be noted that the engine compartment of the hinged hood is shown in a locked or a latched position in both figures.

In carrying out my invention, I employ a housing box for mounting on an accessible position of a vehicle, such as in a clamped or secure, suspended relation from the panel or dashboard of the vehicle. The device is provided with a latch plunger which may be manually operated for latching and unlatching a hinged compartment of a vehicle; when the device is locked, it will positively maintain the closed relation of the compartment. The device also has an electric switch provided with opening and closing contacts. The switch is preferably of a normally open, conventional micro-switch type and has an operating element, projecting lug or finger that, in its extended or upper position, permits the switch contacts to remain closed and that, in its pressed-in or lower position, opens such contacts.

The electric switch is adapted to be connected in the electrical system of the vehicle and is operated cooperatively with the latching and unlatching of the plunger in such a manner as to open the switch contacts when the plunger is latched or, in other words, when the plunger has been moved to its compartment latching position, and to close its contacts when the plunger has been unlatched or moved to its compartment unlatching position.

With particular reference to the illustrated device of the drawings, I have shown a front portion of a representative motor vehicle 10 having body and fender portions 11 and a hinged hood 12. In FIGURES 4 and 5, 13 represents the ordinary fire wall between the engine compartment and the passenger compartment which is located below the front portion of the windshield. The vehicle 10 is also shown as having a dash or instrument panel 14 which projects downwardly and ordinarily, has an in-turned or forwardly-turned flange portion that may serve as a mounting portion for a device 20 of my invention. In FIGURE 2, I diagrammatically show a conventional ignition switch 15 and a conventional source of electrical current, such as a storage battery 16. Although my device may be utilized for latching and unlatching any suitable compartment of a motor-energized vehicle in accordance with the desires of an authorized operator, it has particular application to the latching and unlatching of the hood 12 of an automobile.

Referring particularly to FIGURES 1 to 3, inclusive, the device 20 is shown provided with a substantially rectangular box-like housing 21 having a back end wall or projecting flange 21a, an opposed front end wall or projecting flange 21b, and opposed projecting side walls or flanges 21c and 21d. This box-like structure is employed to contain the operating mechanism of my device. As shown in FIGURE 3, the chamber or compartment of the housing 21 may be closed by a flanged closure, top or cover plate 22. Threaded bolts, stems or threaded screwhead elements 23 and 24 project inwardly from a bottom wall of the housing 20 and are provided with nuts 23b and 24b, respectively, to removably-secure the cover plate 22 in position. If desired, the nuts may be brazed in position or the threaded ends of the screws may be flatteneddown to make it difficult for a thief to gain entry to the inside of the housing. It will be noted that a threaded, intermediate nut 23a is also positioned on the threaded stem 23 for securing the stem on the back wall of the housing 21. Threaded stem 24 also has an intermediate nut 24a which is employed for a purpose which will be hereinafter indicated.

A suitable conventional lock and preferably a combination lock unit 25 of a dial type which operates with an audible or sensing, clicking sound or movement is carried or positioned within the housing 21 and has a stem or operating shaft 25a projecting from the back wall of the housing. A knurled knob or dial 25b is secured on the end of the shaft or stem 25a, so that a person having authorized knowledge of the combination can readily turn the knob 25b to lock and unlock the lock unit and without the necessity of viewing a dial. The lock 25 may be of a commercial type, such as manufactured and sold by the C. L. Gougler Machine Company, Lock Division, Kent, Ohio, as its model No. 50. However, any other suitable type of lock may be utilized. It will be noted that the lock 25 is provided with a throw arm or cam projection 25c which is normally in the withdrawn position illustrated in FIGURE 1 when the lock is locked and is moved into an outwardly-projecting position, such as shown in FIGURE 2, when the lock is unlocked. The operation or throw of this cam 25c is employed for moving or latching and unlatching an operating latch plunger 40 and for opening and closing micro switch 32. The lock unit 25 may be secured within the housing 21 by a threaded element, stem or bolt 26 and a nut 26a and by the secondary or intermediate nut 24a, as utilized with the threaded element or stem 24.

An angle-shaped striker or abutment plate part or element 27 is adapted to be mounted on the stem 24 in tight abutment with the lock unit 25, so that its tab or flange portion 27a projects backwardly along an end wall of the lock. The striker plate 27 is utilized to operate the micro switch 32 by means of its backwardly projecting tab portion 27a.

The micro switch 32 may be of a type commercially available in electrical stores and, as utilized, is a normally open type as to its switch contacts. The switch 32 has a lug, finger or operating element 32a projecting therefrom which is normally spring-pressed outwardly so as to maintain the switch contacts in a closed relation, but which, when pressed inwardly, moves the contacts out of a cooperative closed position into an open relation. In FIGURE 1, the element 32a is in its inwardly-pressed or moved switch-contact-opening position and in FIGURE 2, is in its normal projecting, switch-contact-closing position. It will be noted that the operating element 32a is moved inwardly by engagement with the tab portion 27a of the striker plate 27 when the switch is moved or swung to its upper position of FIGURE 1.

An operating swing arm member 30 is pivotally-operatively mounted within the housing 21 by a pivot pin 31 for swinging movement between the positions indicated in FIGURES 1 and 2. The arm member 30 has a downwardly-projecting leg portion 30a which receives the pivotal pin 31 and a forwardly-projecting latching portion or offset 30c that is adapted to engage within a complementary offset, latching slot or groove portion 41c of the latch plunger 40. The arm 30 also has a forwardly-projecting tab or flange portion 30b which serves as a striker tab for the operating cam 25c of the lock unit 25. As shown in FIGURES 1 and 2, the micro switch unit 32 is securely-mounted on the backwardly projecting portion of the operating arm member 31, as by set screws 33, for movement with such arm member. A spiral tension spring or resilient force-exerting element 35 is operatively-mounted on a cylindrical projection or lug 34 that extends from the inside of the end wall 21b of the housing. The spring 35 at its other or upper end abuts against the backwardly-projecting portion of the operating arm member 30 and the base of the switch 32 to normally resiliently-move the arm member 30 and its associated switch 32 away from the wall 21b and into a position in which the operating element 32a of the switch is moved inwardly to open the switch contacts and the latching portion 35c is moved outwardly or into cooperative engagement with the offset latching portion 41c of the latch plunger 40.

As shown in FIGURE 2, the cam 25c works in opposition to the spring 25 when the cam is moved outwardly at the time the lock unit 25 is moved to an unlocked position. The switch 32 is shown provided with projecting lugs 32b and 32c for connecting it in the electrical system by means of insulated wire leads a and b. In FIGURE 2, the lead a is shown as connected to the ignition switch 15 and the lead b is shown connected to the battery 16. An insulated bezel or sleeve 36 is shown provided in an opening in the wall 21b for bypassing the leads a and b.

The latch plunger 40 is shown provided with a main or enlarged cylindrical part 41 which is adapted to operate within the compartment of the housing 21 and, at its front end, to project forwardly thereof. A rod-like or reduced diameter part 41a projects backwardly from the part 41 and out through back wall 21a of the housing 21 to receive a knurled operating knob 42. As shown particularly in FIGURE 2, the knob 42 may be secured on the end of the plunger part 41a by an Allen head set screw 43. The knob 42 enables the plunger 40 to be manually moved forwardly and backwardly within the housing 21 and between a forward compartment-latching position and a backward compartment-unlatching position (see FIGURES 1 and 2.)

A guide bearing projection 47 extends inwardly from the wall 21c to slidably-engage a flattened length or side portion 40b of the main cylindrical part 41 so as to guide the inner end portion of the latch plunger 40 as to its movement within the housing. The outer end portion of the part 41 is guided within the edges of an opening in the wall 21b. The side of the part 41 is also provided with a pair of longitudinally spaced-apart angular-shaped slots, notches or offsets 41b and 41e to receive a snap-in, projecting angular end portion 40a of a strap spring member or part 48. The spring 48 is secured at its other end to the wall 21c by a pin 49 to extend along the wall 21c for a major portion of its length. The leaf or strap spring 48 thus serves to resiliently-hold the latch plunger 40 in its two positions, namely its compartment-latching position of FIGURE 1 and its compartment-unlatching position of FIGURE 2. In other words, the notch 41d serves to indicate to the operator, in pushing the knob 42 forwardly, the maximum movement necessary to unlatch the hinged hood or the engine compartment, while the notch 41e serves to indicate to the operator the maximum outward pull necessary to move the plunger 40 to its compartment-unlatching position.

As shown in FIGURE 3, a channel-shaped mounting bracket 50 is secured, as by weld metal w, to project outwardly from the closure plate member 22 and is provided with a threaded element, bolt or set screw 51 for engaging an outwardly or forwardly-projecting flange portion 14a of the dash 14 of the vehicle. This enables the device 20 to be securely clamped by means of the bracket 50 in position with respect to an accessible portion of the vehicle 10. If desired, the element 51 may, in its mounted position, be brazed to the bracket 50 to prevent removal of the device 20.

The outer end of the part 41 is shown of hollow construction to receive an end of an operating or connecting rod 44 which may be secured therein by an Allen head set screw 45, as shown in FIGURE 1. With particular reference to FIGURES 4 and 5, it will be noted that the operating rod 44 is, at its forward or other end, pivotally-secured at 58 to a latching means 55. The latching means 55 is shown as an arm centrally-pivoted at 56 to the frame or body of the vehicle for movement between a backwardly-tilted, full-line latching position of FIGURE 4 and a forwardly-tilted, unlatched position. In this connection, a latch projection 57 extends inwardly from the hood 12 for engagement by a hook-shaped, upper, latching end portion 55a of the means 55.

As shown in FIGURES 3 and 4, a guide mount 52 may be provided for guiding the operating rod 44 with respect to the fire wall 13. The mount has a sleeve bearing portion 52a through which the rod 44 extends and is adapted to be slidably moved. A mounting flange 52b may be employed with metal screws 53 for securing the mount 52 on the fire wall 13.

When the device 20 is mounted on the vehicle, as shown in FIGURE 4, its latch plunger 40 is operatable axially or longitudinally-forwardly and backwardly at right angles to the dash 14. The knob 25b of the lock unit 25 is operative from an under position with respect to the housing 21 (see FIGURE 3). Since the lock 25 is preferably of a clicking type as to its combination, it can be locked and unlocked without the operator looking at a graduated dial face.

Although for the purpose of illustration, I have shown a preferred embodiment of my invention, it will be apparent to those skilled in the art that various changes may be made without departing from the spirit and scope of my invention, and that micro switch 32 although shown as supplemental in operation to the conventional ignition switch 15, may be employed as the ignition switch. However, I prefer to provide a conventional ignition switch, so the the vehicle may be operated conventionally when the device 20 is in its unlatched position of FIGURE 2 and may be continued to be operated conventionally until the owner of the vehicle desires to park it in a location where maximum security is desirable.

What I claim is:

1. A lock-switch device for preventing an unauthorized opening of a hinged hood of an engine compartment of and for preventing an unauthorized energization of the electric ignition system of a motor vehicle which comprises, a lock operatively mounted in said housing, an electric switch in said housing connected to the ignition system, hood latch means for operative positioning within the engine compartment to in one position latch-engage the hood and hold it in a closed position and to in another position unlatch the hood whereby the hood may be swung to an open position, a latch plunger operatively positioned for in and out movement within said housing and extending therefrom, means for operatively connecting said latch plunger to said hood latch means for latching and unlatching said hood latch means in accordance with the movement of said latch plunger, an arm member operatively positioned for movement within said housing; said arm member having a latching portion to, when said arm member is in one position, engage said latch plunger for positively retaining it in a position at which said hood latch means is in latching engagement with the hood; means cooperating with said arm member and said lock for opening said electric switch when said arm member is moved to the one position and for closing said switch when said arm member is moved to a second position; and cam means positioned within said housing and operatively associated with said lock to, when said lock is unlocked, engage said arm member and move said arm member from its one to its second position at which said latching portion disengages said plunger, whereby said plunger may be moved within said housing to move said hood latch means to its other hood unlatching position.

2. A lock-switch device for preventing the unauthorized opening of a hinged hood of an engine compartment and for preventing energization of the ignition system of a motor vehicle which comprises, a housing adapted to be mounted in an accessible position on the vehicle, a plunger operatively carried by said housing and projecting through opposed walls thereof, said plunger having a grip portion at its back end for manually moving it inwardly and outwardly within said housing; a pivotal latch means for operative mounting on the vehicle to, in one position, latch-engage the hood and to, in another position, unlatch the hood; connecting means between said latch means and an inner end of said plunger for moving said latch means between its two positions by in and out movement of said plunger, an electric switch positioned within said housing, an arm member positioned for operative movement within said housing and carrying said electric switch to open and close said switch in accordance with its operative movement, a latching offset on said plunger within said housing, said arm member having a latching portion adapted to latch-engage with said latching offset when said plunger is moved inwardly within said housing to move said latch means into latching engagement with the hood, said electric switch having means to close its contacts when said arm member has been moved out of latching engagement with said plunger and to open its contacts when said latching portion is in latching-engagement with said latching offset of said plunger, a lock operatively positioned in said housing and having means for locking and unlocking it; and said lock having a cam projection to, when said lock is unlocked, engage said arm member and move said latching portion out of latching engagement with said latching offset of said plunger.

3. A device as defined in claim 2 wherein means swingably positions said arm member for operating movement within said housing.

4. A device as defined in claim 2 wherein said lock is a combination lock and has an operating knob projecting from said housing for dialing it into and out of a locked and unlocked position.

5. A device as defined in claim 2 wherein spring means is operatively positioned within said housing in engagement with said arm member to normally urge said arm member towards a position in which said latching portion latch-engages said latching offset and to resiliently resist movement of said arm member towards its other position.

6. A device as defined in claim 2 wherein, said latch plunger has a pair of axially-spaced notches along its side, a strap spring is secured at one end to said housing and at its other end has an angle-shaped end portion to resiliently engage within said notches to limit the in and out movement of said latch plunger between its two positions.

7. A lock-switch device for a motor vehicle having a dashboard, a frame, a motor compartment, a hood hinged to normally close the motor compartment, a pivoted latch for latching and unlatching the hood in its closed position, an electric current source, and an ignition switch connected to the electric current source; the device being adapted for preventing the unauthorized opening of the hinged hood and for preventing energization of the ignition system when the ignition switch is closed which comprises, a housing box having means for securing it in an accessible position on the dashboard, an electric micro switch and a plunger operatively positioned within said housing, said micro switch being adapted to be connected between the electric current source and the ignition switch of the vehicle, said plunger projecting at its front and back ends from said housing and having an operating knob at its back end, an operating shaft adapted to be connected between the front end of said plunger and the pivoted latch for moving the pivoted latch into and out of its latching position with the hood, a lock positioned in said housing and having a cam means operatively associated therewith for outward movement with respect to said lock within said housing when said lock is unlocked and for inward movement with respect thereto when said lock is locked, a swing arm member pivotally mounted in said housing and carrying said micro switch, said plunger having a latching notch portion therein, said arm member having a projecting latch portion for positive latching-engagement with said latching notch portion, means operatively positioned within said housing for normally urging said arm member and its said latch portion into latching-engagement with said latching notch portion, and said switch having means for opening its contacts when said arm member is moved to its latching position with respect to said plunger.

8. A device as defined in claim 7 wherein said means for securing said housing on the dashboard is a projecting clamp having an adjustable clamping element.

9. A device as defined in claim 7 wherein said lock is a combination type of lock and has a dial on the outside of said housing for turning it into and out of a locking position.

10. A compartment latching and unlatching device for a motor vehicle having an electric ignition circuit, said device comprising, a housing for mounting in an accessible position on the vehicle, a lock mounted in said housing for locking and unlocking movement, a latch plunger positioned in said housing for movement therein between a compartment-latching position and a compartment-unlatching position, an arm member having a latching portion for latch-engaging with said latch plunger to positively hold it in its compartment-latching position, said arm member being positioned within said housing for movement between one position in which said latching portion engages said latch plunger and a second position in which it disengages said latch plunger, resilient means operatively positioned within said housing for normally urging said arm member towards its one position, cam means operatively carried within said housing by said lock for outward movement when said lock is unlocked to engage with and move said arm member against force exerted by said resilient means from its one position to its second position; said latch plunger having means for moving it into its compartment-latching position and, when said arm member has been moved to its second position, for moving said latch plunger into its compartment-unlatching position; an electric switch operatively positioned with said housing and having contacts for opening and closing the ignition circuit, and said switch having an operating element projecting therefrom and cooperating with said lock to close the contacts when said arm member is moved to its one position by said resilient means and for opening the contacts when said arm member is moved by said cam means to its second position.

11. A device as defined in claim 10 wherein said lock is a combination lock that has an operating knob, and has a click-producing means for audibly indicating its reading when its operating knob is turned in accordance with the combination.

12. A device as defined in claim 10 wherein, means is carried by said housing for guiding said plunger in its movement, and resilient means is carried by said housing and cooperates with said plunger for resiliently retaining it in its compartment-latching and unlatching positions.

13. A compartment latching and unlatching device for a motor vehicle having an electric ignition circuit, said device comprising, a housing for mounting in an accessible position on the vehicle, a lock mounted in said housing for locking and unlocking movement, a latch plunger positioned in said housing for movement therein between a compartment-latching position and a compartment-unlatching position, an arm member having a latching portion for latch-engaging with said latch plunger to positively hold it in its compartment-latching position, said arm member being positioned within said housing for movement between one position in which said latching portion engages said latch plunger and a second position in which it disengages said latch plunger, resilient means operatively positioned within said housing for normally urging said arm member towards its one position, cam means operatively carried within said housing by said lock for outward movement when said lock is unlocked to engage with and move said arm member against force exerted by said resilient means from its one position to its second position; said latch plunger having means for moving it into its compartment-latching position and, when said arm member has been moved to its second position, for moving said latch plunger into its compartment-unlatching position; a micro switch positioned on said arm member for movement therewith, a striker means positioned within said housing, a said switch having an operating element cooperating with said striker means for movement between switch opening and closing positions when said arm member is moved between its two positions.

14. A device as defined in claim 13 wherein, said striker means is a stationary striker plate carried by said lock, means secures said switch on said arm member for movement therewith, and said operating element is moved by said striker plate from a switch closing to a switch opening position when said arm member is moved from its one to its second position.

References Cited by the Examiner
UNITED STATES PATENTS

| | | | |
|---|---|---|---|
| 1,397,484 | 11/1921 | Coo | 70—240 |
| 1,419,227 | 6/1922 | Coo | 70—240 |
| 1,582,528 | 4/1926 | Michael | 70—256 X |
| 1,857,705 | 5/1932 | Wolff et al. | 180—69 |
| 2,246,787 | 6/1941 | Dall | 292—99 |
| 2,637,789 | 5/1953 | Critchfield et al. | 70—241 X |

KENNETH H. BETTS, *Primary Examiner.*